(12) United States Patent
Locke

(10) Patent No.: US 11,747,430 B2
(45) Date of Patent: Sep. 5, 2023

(54) CORRELATION OF SENSORY INPUTS TO IDENTIFY UNAUTHORIZED PERSONS

(71) Applicant: TYCO FIRE & SECURITY GMBH, Neuhausen am Rheinfall (CH)

(72) Inventor: Robert B. Locke, Sonoma, CA (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 0 days.

(21) Appl. No.: 14/463,765

(22) Filed: Aug. 20, 2014

(65) Prior Publication Data

US 2015/0287301 A1 Oct. 8, 2015
US 2017/0323546 A9 Nov. 9, 2017

Related U.S. Application Data

(60) Provisional application No. 61/973,962, filed on Apr. 2, 2014, provisional application No. 61/946,054, filed on Feb. 28, 2014.

(51) Int. Cl.
*G08B 13/24* (2006.01)
*G01S 5/02* (2010.01)
(Continued)

(52) U.S. Cl.
CPC .......... *G01S 5/0236* (2013.01); *G01S 5/0284* (2013.01); *G01S 5/0294* (2013.01); *G06F 18/00* (2023.01);
(Continued)

(58) Field of Classification Search
CPC .......... G08B 13/19645; G08B 13/2491; G08B 13/22; G08B 13/00; G08B 13/2451;
(Continued)

(56) References Cited

U.S. PATENT DOCUMENTS 4,581,634 A * 4/1986 Williams ........... G07C 9/00079
348/156
5,406,327 A 4/1995 Guarnotta
(Continued)

FOREIGN PATENT DOCUMENTS

CN 1217078 A 5/1999
CN 1353849 A 6/2002
(Continued)

OTHER PUBLICATIONS

International Search Report and Written Report, PCT/US/15/17450.
(Continued)

*Primary Examiner* — Daniel I Walsh
(74) *Attorney, Agent, or Firm* — Foley & Lardner LLP

(57) ABSTRACT

A networked system for managing a physical intrusion detection/alarm includes an upper tier of server devices, comprising: processor devices and memory in communication with the processor devices, a middle tier of gateway devices that are in communication with upper tier servers, and a lower level tier of devices that comprise fully functional nodes with at least some of the functional nodes including an application layer that execute routines to provide node functions, and a device to manage the lower tier of devices, the device instantiating a program manager that executes a state machine to control the application layer in each of the at least some of the functional nodes.

20 Claims, 4 Drawing Sheets

(51) Int. Cl.

| | |
|---|---|
| *G08B 13/196* | (2006.01) |
| *G08B 13/00* | (2006.01) |
| *H04W 4/029* | (2018.01) |
| *H04W 4/80* | (2018.01) |
| *G08B 25/00* | (2006.01) |
| *G07C 9/20* | (2020.01) |
| *G08B 7/06* | (2006.01) |
| *G06N 5/02* | (2023.01) |
| *G08B 13/22* | (2006.01) |
| *G08B 25/10* | (2006.01) |
| *H04N 7/18* | (2006.01) |
| *H04W 88/16* | (2009.01) |
| *G06F 18/00* | (2023.01) |
| *H04L 67/02* | (2022.01) |
| *H04L 45/74* | (2022.01) |
| *H04L 67/10* | (2022.01) |
| *H04W 84/18* | (2009.01) |
| *H04L 29/08* | (2006.01) |
| *G06K 9/00* | (2022.01) |
| *H04L 12/741* | (2013.01) |
| *H04W 4/18* | (2009.01) |
| *H04W 4/02* | (2018.01) |

(52) U.S. Cl.
CPC .............. *G06N 5/027* (2013.01); *G07C 9/20* (2020.01); *G08B 7/062* (2013.01); *G08B 13/00* (2013.01); *G08B 13/19613* (2013.01); *G08B 13/19697* (2013.01); *G08B 13/22* (2013.01); *G08B 13/2451* (2013.01); *G08B 13/2491* (2013.01); *G08B 25/009* (2013.01); *G08B 25/10* (2013.01); *H04L 45/74* (2013.01); *H04L 67/02* (2013.01); *H04L 67/10* (2013.01); *H04N 7/181* (2013.01); *H04W 4/029* (2018.02); *H04W 4/80* (2018.02); *H04W 84/18* (2013.01); *H04W 88/16* (2013.01); *H04W 4/02* (2013.01)

(58) Field of Classification Search
CPC ........ G08B 13/19697; G08B 13/19613; G08B 13/3491; G08B 13/19608; G08B 21/0492; G01S 5/02; G01S 5/0284; G01S 5/0294; G01S 3/325; G06F 21/604; G06F 21/31; G07C 9/00; G07C 9/10

See application file for complete search history.

(56) References Cited

U.S. PATENT DOCUMENTS

| | | | |
|---|---|---|---|
| 5,414,812 A | 5/1995 | Filip et al. | |
| 5,727,055 A | 3/1998 | Ivie et al. | |
| 5,977,913 A | 11/1999 | Christ | |
| 6,012,150 A | 1/2000 | Bartfai et al. | |
| 6,032,239 A * | 2/2000 | Beelitz | G06F 3/0607 |
| | | | 711/173 |
| 6,112,237 A | 8/2000 | Donaldson et al. | |
| 6,208,247 B1 | 3/2001 | Agre et al. | |
| 6,272,621 B1 | 8/2001 | Key et al. | |
| 6,313,549 B1 | 11/2001 | Moisan et al. | |
| 6,335,688 B1 * | 1/2002 | Sweatte | 340/573.1 |
| 6,513,108 B1 | 1/2003 | Kerr et al. | |
| 6,531,963 B1 * | 3/2003 | Nyfelt | G01S 13/74 |
| | | | 340/573.1 |
| 6,636,900 B2 | 10/2003 | Abdelnur | |
| 6,658,234 B1 | 12/2003 | Dogan et al. | |
| 6,741,165 B1 | 5/2004 | Langfahl et al. | |
| 6,757,008 B1 | 6/2004 | Smith | |
| 6,771,385 B1 | 8/2004 | Iizuka et al. | |
| 6,804,790 B2 | 10/2004 | Rhee et al. | |
| 6,812,970 B1 | 11/2004 | McBride | |
| 6,836,843 B2 | 12/2004 | Seroussi et al. | |
| 6,838,992 B2 | 1/2005 | Tenarvitz | |
| 6,867,683 B2 | 3/2005 | Calvesio et al. | |
| 6,873,260 B2 | 3/2005 | Lancos et al. | |
| 6,888,459 B2 * | 5/2005 | Stilp | G07C 9/00103 |
| | | | 340/10.1 |
| 6,924,732 B2 | 8/2005 | Yokoo | |
| 6,933,849 B2 * | 8/2005 | Sawyer | 340/572.4 |
| 6,952,574 B2 | 10/2005 | Tealdi et al. | |
| 6,970,183 B1 | 11/2005 | Monroe | |
| 6,972,683 B2 | 12/2005 | Lestienne et al. | |
| 6,976,032 B1 | 12/2005 | Hull et al. | |
| 7,003,291 B2 | 2/2006 | Zhnag | |
| 7,005,971 B2 | 2/2006 | Stewart et al. | |
| 7,017,171 B1 | 3/2006 | Horlander et al. | |
| 7,028,018 B2 | 4/2006 | Kocher | |
| 7,176,808 B1 | 2/2007 | Broad et al. | |
| 7,212,563 B2 | 5/2007 | Boyd et al. | |
| 7,222,239 B2 | 5/2007 | Smith | |
| 7,286,158 B1 * | 10/2007 | Griebenow | G07C 9/00103 |
| | | | 340/505 |
| 7,295,106 B1 * | 11/2007 | Jackson | G06K 9/00771 |
| | | | 340/5.8 |
| 7,313,399 B2 | 12/2007 | Rhee et al. | |
| 7,327,251 B2 * | 2/2008 | Corbett, Jr. | G08B 21/0261 |
| | | | 340/5.2 |
| 7,365,645 B2 | 4/2008 | Heinze et al. | |
| 7,382,895 B2 * | 6/2008 | Bramblet | G07C 9/00 |
| | | | 382/103 |
| 7,441,043 B1 | 10/2008 | Henry et al. | |
| 7,474,330 B2 | 1/2009 | Wren et al. | |
| 7,477,154 B2 | 1/2009 | Braunstein | |
| 7,512,406 B2 | 3/2009 | Dorfman | |
| 7,525,594 B2 | 4/2009 | Tatamiya et al. | |
| 7,535,687 B2 | 5/2009 | Costa | |
| 7,545,326 B2 | 6/2009 | Caliri et al. | |
| 7,564,357 B2 | 7/2009 | Baranowski et al. | |
| 7,636,046 B2 | 12/2009 | Caliri et al. | |
| 7,664,481 B2 | 2/2010 | Braunstein | |
| 7,688,808 B2 | 3/2010 | Ren et al. | |
| 7,689,221 B1 | 3/2010 | Gazzard | |
| 7,705,736 B1 | 4/2010 | Kedziora | |
| 7,756,828 B2 | 7/2010 | Baron et al. | |
| 7,804,849 B2 | 9/2010 | Mahany et al. | |
| 7,834,766 B2 | 11/2010 | Sawyer | |
| 7,855,635 B2 | 12/2010 | Cohn et al. | |
| 7,884,712 B2 | 2/2011 | Nierenberg et al. | |
| 7,899,006 B2 | 3/2011 | Boyd | |
| 7,907,053 B2 | 3/2011 | Wildman et al. | |
| 7,907,753 B2 | 3/2011 | Wilson et al. | |
| 7,908,020 B2 | 3/2011 | Pieronek | |
| 7,916,026 B2 | 3/2011 | Johnson et al. | |
| 7,920,843 B2 | 4/2011 | Martin et al. | |
| 7,956,746 B2 | 6/2011 | Truscott et al. | |
| 7,966,660 B2 | 6/2011 | Yermal et al. | |
| 7,978,082 B2 | 7/2011 | Braunstein | |
| 8,009,034 B2 | 8/2011 | Dobson et al. | |
| 8,073,964 B2 | 12/2011 | Dunk | |
| 8,089,910 B2 | 1/2012 | Doh et al. | |
| 8,107,397 B1 | 1/2012 | Bagchi et al. | |
| 8,115,622 B2 | 2/2012 | Stolarczyk et al. | |
| 8,115,862 B2 | 2/2012 | Umeyama et al. | |
| 8,310,364 B2 | 2/2012 | Harry et al. | |
| 8,149,849 B2 | 4/2012 | Osborn et al. | |
| 8,164,443 B2 | 4/2012 | Alston et al. | |
| 8,171,524 B2 | 5/2012 | Micali et al. | |
| 8,207,814 B2 | 6/2012 | Biles et al. | |
| 8,260,893 B1 | 9/2012 | Bandhole et al. | |
| 8,305,196 B2 | 11/2012 | Kennedy et al. | |
| 8,305,842 B2 | 11/2012 | Holdsworth | |
| 8,311,558 B2 | 11/2012 | Davidson et al. | |
| 8,319,635 B2 | 11/2012 | Perkins et al. | |
| 8,331,544 B2 | 12/2012 | Kraus et al. | |
| 8,335,164 B2 | 12/2012 | Liu | |
| 8,350,700 B2 | 1/2013 | Fast et al. | |
| 8,380,558 B1 * | 2/2013 | Sharma et al. | 705/7.29 |
| 8,390,442 B2 | 3/2013 | Burns et al. | |
| 8,395,494 B2 | 3/2013 | Trundle et al. | |
| 8,400,268 B1 | 3/2013 | Malik et al. | |

(56) References Cited

U.S. PATENT DOCUMENTS

| | | |
|---|---|---|
| 8,406,480 B2 | 3/2013 | Grigsby et al. |
| 8,428,550 B2 | 4/2013 | Larsen |
| 8,457,656 B2 | 6/2013 | Perkins et al. |
| 8,463,619 B2 | 6/2013 | Scarola |
| 8,467,763 B2 | 6/2013 | Martin et al. |
| 8,477,687 B2 | 7/2013 | Iwasa |
| 8,487,762 B1 | 7/2013 | McMullen et al. |
| 8,488,589 B2 | 7/2013 | Rudnick et al. |
| 8,499,164 B2 | 7/2013 | Ortiz et al. |
| 8,502,644 B1 | 8/2013 | Newman et al. |
| 8,502,670 B2 | 8/2013 | Cha et al. |
| 8,525,665 B1 | 9/2013 | Trundle et al. |
| 8,527,640 B2 | 9/2013 | Reisman |
| 8,537,714 B2 | 9/2013 | Liu |
| 8,559,344 B2 | 10/2013 | Abusch-Magder et al. |
| 8,566,413 B2 | 10/2013 | Horvitz |
| 8,572,290 B1 | 10/2013 | Mukhopadhyay et al. |
| 8,572,600 B2 | 10/2013 | Chung et al. |
| 8,572,677 B2 | 10/2013 | Bartholomay et al. |
| 8,578,153 B2 | 11/2013 | Johansson et al. |
| 8,582,431 B2 | 11/2013 | Johansen |
| 8,587,670 B2 | 11/2013 | Wood et al. |
| 8,599,011 B2 | 12/2013 | Schantz et al. |
| 8,611,323 B2 | 12/2013 | Berger et al. |
| 8,618,916 B2 | 12/2013 | Gravelle et al. |
| 8,624,733 B2 * | 1/2014 | Cusack, Jr. .................. 340/541 |
| 8,629,755 B2 | 1/2014 | Hashim-Waris |
| 8,630,820 B2 | 1/2014 | Amis |
| 8,633,803 B2 | 1/2014 | Mo et al. |
| 8,633,829 B2 | 1/2014 | Cavanaugh |
| 8,634,788 B2 | 1/2014 | Wright et al. |
| 8,635,126 B2 | 1/2014 | Risnoveanu et al. |
| 8,643,719 B2 | 2/2014 | Vian et al. |
| 8,644,165 B2 | 2/2014 | Saarimaki et al. |
| 8,659,417 B1 | 2/2014 | Trundle et al. |
| 8,659,420 B2 | 2/2014 | Salvat, Jr. |
| 8,667,571 B2 | 3/2014 | Raleigh |
| 8,670,873 B2 | 3/2014 | Shloush et al. |
| 8,675,920 B2 | 3/2014 | Hanson et al. |
| 8,676,930 B2 | 3/2014 | Foisy |
| 8,682,541 B2 | 3/2014 | Best et al. |
| 8,686,851 B2 | 4/2014 | Davis |
| 8,689,290 B2 | 4/2014 | Buer |
| 8,694,275 B2 | 4/2014 | Wang et al. |
| 8,696,430 B2 | 4/2014 | Wells |
| 8,699,377 B2 | 4/2014 | Veillette |
| 8,700,747 B2 | 4/2014 | Spitaels et al. |
| 8,700,749 B2 | 4/2014 | Elliott et al. |
| 8,707,397 B1 | 4/2014 | Wilkinson et al. |
| 8,707,431 B2 | 4/2014 | Stephens et al. |
| 8,711,197 B2 | 4/2014 | Dickerson et al. |
| 8,711,704 B2 | 4/2014 | Werb et al. |
| 8,715,178 B2 | 5/2014 | Price et al. |
| 8,723,972 B2 | 5/2014 | Hinkel et al. |
| 8,725,175 B2 | 5/2014 | Altman et al. |
| 8,727,225 B2 | 5/2014 | Zumsteg et al. |
| 8,730,838 B2 | 5/2014 | Liang et al. |
| 8,731,689 B2 | 5/2014 | Platner et al. |
| 8,732,255 B2 | 5/2014 | Odio et al. |
| 8,732,292 B2 | 5/2014 | Tokunaga et al. |
| 8,737,957 B2 | 5/2014 | Raleigh |
| 8,739,176 B1 | 5/2014 | Darling |
| 8,742,908 B2 | 6/2014 | Boudy |
| 8,742,929 B2 | 6/2014 | Sawyer |
| 8,750,513 B2 | 6/2014 | Renkis |
| 8,752,106 B2 | 6/2014 | Renkis |
| 8,848,721 B2 | 9/2014 | Turunen et al. |
| 8,989,053 B1 | 3/2015 | Skaaksrud et al. |
| 9,037,152 B1 | 5/2015 | Herrera et al. |
| 9,277,352 B1 | 3/2016 | Ward |
| 9,384,607 B1 * | 7/2016 | Copeland ............ G07C 9/00309 |
| 9,892,574 B2 * | 2/2018 | Schlechter ............ G07C 9/00079 |
| 9,905,101 B1 * | 2/2018 | Billau .................... G07C 9/20 |
| 9,996,997 B2 * | 6/2018 | Lambert ................ G07C 9/37 |
| 10,282,852 B1 * | 5/2019 | Buibas |
| 10,692,364 B1 * | 6/2020 | Rao ........................ G08B 31/00 |
| 11,024,105 B1 * | 6/2021 | Brand ................ G06K 7/10366 |
| 2002/0057204 A1 | 5/2002 | Bligh ..................... G09F 19/22 340/691.1 |
| 2002/0067259 A1 * | 6/2002 | Fufidio ................. G08B 13/183 340/541 |
| 2002/0113879 A1 * | 8/2002 | Battle et al. ............... 348/207.2 |
| 2002/0121979 A1 * | 9/2002 | Smith ............... G08B 13/2445 340/572.1 |
| 2003/0023874 A1 * | 1/2003 | Prokupets ................ G07C 9/20 726/4 |
| 2003/0043763 A1 | 3/2003 | Grayson |
| 2003/0075287 A1 * | 4/2003 | Weik, III .................. E06B 9/70 160/133 |
| 2003/0086591 A1 * | 5/2003 | Simon .......................... 382/115 |
| 2003/0097464 A1 | 5/2003 | Martinez et al. |
| 2003/0097586 A1 | 5/2003 | Mok |
| 2003/0099221 A1 | 5/2003 | Rhee |
| 2003/0169337 A1 * | 9/2003 | Wilson .................. G06K 19/08 348/156 |
| 2003/0187612 A1 | 10/2003 | Miyake |
| 2003/0216144 A1 | 11/2003 | Roese et al. |
| 2004/0017929 A1 * | 1/2004 | Bramblet ................ G07C 9/00 382/103 |
| 2004/0027242 A1 * | 2/2004 | Venetianer ....... G08B 13/19673 340/555 |
| 2004/0027243 A1 | 2/2004 | Carrender |
| 2004/0090329 A1 | 5/2004 | Hitt |
| 2004/0103164 A1 | 5/2004 | Tabuchi et al. |
| 2004/0103165 A1 | 5/2004 | Nixon et al. |
| 2004/0105006 A1 * | 6/2004 | Lazo ..................... G01S 3/7864 348/169 |
| 2004/0109059 A1 | 6/2004 | Kawakita |
| 2004/0135694 A1 * | 7/2004 | Nyfelt ................ G07C 9/00111 340/573.1 |
| 2004/0153671 A1 * | 8/2004 | Schuyler .................. G07C 9/00 726/9 |
| 2004/0169587 A1 * | 9/2004 | Washington ....... G06K 7/10079 340/573.1 |
| 2004/0199785 A1 * | 10/2004 | Pederson ........... G07C 9/00158 340/293 |
| 2005/0018049 A1 * | 1/2005 | Falk ........................ 348/207.99 |
| 2005/0052281 A1 | 3/2005 | Bann |
| 2005/0104727 A1 * | 5/2005 | Han ................. G08B 13/19604 340/541 |
| 2005/0143133 A1 | 6/2005 | Bridgelall |
| 2005/0162515 A1 * | 7/2005 | Venetianer .......... G06F 16/7854 348/143 |
| 2005/0179553 A1 * | 8/2005 | Fujie ................ G08B 13/19669 340/573.4 |
| 2006/0022816 A1 * | 2/2006 | Yukawa ............... G08B 25/006 340/521 |
| 2006/0031838 A1 | 2/2006 | Chrabieh |
| 2006/0035205 A1 * | 2/2006 | Dobson ............... G07C 9/00111 434/350 |
| 2006/0039356 A1 * | 2/2006 | Rao ..................... H04L 43/0817 370/352 |
| 2006/0047666 A1 | 3/2006 | Bedi et al. |
| 2006/0059557 A1 | 3/2006 | Markham et al. |
| 2006/0064477 A1 * | 3/2006 | Renkis ......................... 709/223 |
| 2006/0143439 A1 | 6/2006 | Arumugam et al. |
| 2006/0171570 A1 * | 8/2006 | Brendley et al. ............. 382/115 |
| 2006/0240818 A1 | 10/2006 | McCoy et al. |
| 2006/0258427 A1 * | 11/2006 | Rowe et al. .................... 463/16 |
| 2006/0268901 A1 | 11/2006 | Choyi et al. |
| 2006/0282886 A1 | 12/2006 | Gaug |
| 2006/0285579 A1 | 12/2006 | Rhee et al. |
| 2007/0011683 A1 | 1/2007 | Helander |
| 2007/0013776 A1 * | 1/2007 | Venetianer ............. H04N 7/181 348/143 |
| 2007/0018826 A1 | 1/2007 | Nowak et al. |
| 2007/0028119 A1 * | 2/2007 | Mirho ..................... G07C 9/00 713/189 |
| 2007/0040672 A1 * | 2/2007 | Chinigo ................. G07C 5/0891 340/539.22 |
| 2007/0058634 A1 | 3/2007 | Gupta et al. |
| 2007/0073861 A1 | 3/2007 | Amanuddin et al. |

(56) References Cited

U.S. PATENT DOCUMENTS

| | | | |
|---|---|---|---|
| 2007/0086626 A1* | 4/2007 | Mariani | G06K 9/00228 382/115 |
| 2007/0093975 A1 | 4/2007 | Hoogenboom | |
| 2007/0094716 A1 | 4/2007 | Farino et al. | |
| 2007/0106775 A1 | 5/2007 | Wong | |
| 2007/0112574 A1 | 5/2007 | Greene | |
| 2007/0112943 A1 | 5/2007 | Fisher et al. | |
| 2007/0130589 A1 | 6/2007 | Davis et al. | |
| 2007/0136102 A1* | 6/2007 | Rodgers | G08B 21/0469 705/3 |
| 2007/0147425 A1 | 6/2007 | Lamoureux et al. | |
| 2007/0176779 A1 | 8/2007 | Braunstein | |
| 2007/0182818 A1* | 8/2007 | Buehler | G08B 13/19641 348/143 |
| 2007/0185788 A1 | 8/2007 | Dillon | |
| 2007/0186106 A1 | 8/2007 | Ting et al. | |
| 2007/0198997 A1 | 8/2007 | Jacops et al. | |
| 2007/0223451 A1 | 9/2007 | Ren et al. | |
| 2007/0226314 A1 | 9/2007 | Eick et al. | |
| 2007/0239350 A1 | 10/2007 | Zumsteg et al. | |
| 2007/0248065 A1 | 10/2007 | Banerjea et al. | |
| 2007/0252001 A1* | 11/2007 | Kail | G07C 9/33 235/380 |
| 2007/0260470 A1 | 11/2007 | Bornhoevd et al. | |
| 2008/0002599 A1 | 1/2008 | Yau et al. | |
| 2008/0010631 A1 | 1/2008 | Harvey et al. | |
| 2008/0056261 A1 | 3/2008 | Osborn et al. | |
| 2008/0068150 A1 | 3/2008 | Nguyen et al. | |
| 2008/0068267 A1* | 3/2008 | Huseth | G01S 5/14 342/465 |
| 2008/0083018 A1* | 4/2008 | Prokupets | G07C 9/20 726/4 |
| 2008/0100704 A1* | 5/2008 | Venetianer | G08B 29/188 348/143 |
| 2008/0130949 A1* | 6/2008 | Ivanov | H04N 7/181 382/103 |
| 2008/0136620 A1 | 6/2008 | Lee et al. | |
| 2008/0137624 A1 | 6/2008 | Silverstrim et al. | |
| 2008/0144587 A1 | 6/2008 | Gupta et al. | |
| 2008/0186180 A1 | 8/2008 | Butler et al. | |
| 2008/0204267 A1 | 8/2008 | Luterotti et al. | |
| 2008/0246613 A1* | 10/2008 | Linstrom | G08B 13/19695 340/572.4 |
| 2008/0259919 A1 | 10/2008 | Monga | |
| 2008/0291017 A1 | 11/2008 | Yermal et al. | |
| 2008/0291855 A1 | 11/2008 | Bata et al. | |
| 2008/0297346 A1 | 12/2008 | Brackmann et al. | |
| 2009/0002155 A1* | 1/2009 | Ma | G07C 9/00111 340/539.25 |
| 2009/0021634 A1 | 1/2009 | Chang | |
| 2009/0027225 A1* | 1/2009 | Farley | 340/825.37 |
| 2009/0115570 A1* | 5/2009 | Cusack, Jr. | H04N 7/18 340/5.2 |
| 2009/0135007 A1 | 5/2009 | Donovan et al. | |
| 2009/0135762 A1 | 5/2009 | Veillette | |
| 2009/0146833 A1 | 6/2009 | Lee et al. | |
| 2009/0153333 A1 | 6/2009 | Zhang et al. | |
| 2009/0153660 A1* | 6/2009 | Liu | G08B 3/10 348/143 |
| 2009/0174547 A1 | 7/2009 | Greene et al. | |
| 2009/0179742 A1* | 7/2009 | Takeshima | G06K 7/0008 340/10.1 |
| 2009/0222921 A1 | 9/2009 | Mukhopadhyay et al. | |
| 2009/0243844 A1* | 10/2009 | Ishidera | G08B 13/19615 340/540 |
| 2009/0285213 A1 | 11/2009 | Chen et al. | |
| 2009/0319267 A1* | 12/2009 | Kurki-Suonio | G10L 15/30 704/235 |
| 2009/0322510 A1 | 12/2009 | Berger et al. | |
| 2010/0013711 A1 | 1/2010 | Bartlett | |
| 2010/0019901 A1* | 1/2010 | Tsai | G08B 7/066 340/540 |
| 2010/0026802 A1* | 2/2010 | Titus | G08B 13/19613 348/143 |
| 2010/0052867 A1 | 3/2010 | Kwok et al. | |
| 2010/0061272 A1 | 3/2010 | Veillette | |
| 2010/0087188 A1* | 4/2010 | Griff | H04L 41/12 455/424 |
| 2010/0090829 A1* | 4/2010 | Pujol | G08B 13/1965 340/541 |
| 2010/0124209 A1 | 5/2010 | In et al. | |
| 2010/0157062 A1* | 6/2010 | Baba | G07C 9/00563 348/156 |
| 2010/0185773 A1 | 7/2010 | Dunk | |
| 2010/0194545 A1 | 8/2010 | Wong | |
| 2010/0194566 A1* | 8/2010 | Monden | G08B 13/19643 340/568.1 |
| 2010/0214058 A1* | 8/2010 | Walker | G06F 21/34 340/5.6 |
| 2010/0217651 A1 | 8/2010 | Crabtree et al. | |
| 2010/0226342 A1 | 9/2010 | Colling et al. | |
| 2010/0238286 A1* | 9/2010 | Boghossian | G06K 9/00771 348/143 |
| 2010/0295943 A1 | 11/2010 | Cha et al. | |
| 2010/0298010 A1* | 11/2010 | Roth | H04M 1/72525 455/466 |
| 2010/0324958 A1 | 12/2010 | Stiles et al. | |
| 2010/0328443 A1* | 12/2010 | Lynam | G06K 9/036 348/77 |
| 2011/0001606 A1* | 1/2011 | Charych | G07C 9/28 235/382 |
| 2011/0001812 A1* | 1/2011 | Kang | G08B 29/186 348/77 |
| 2011/0035491 A1 | 2/2011 | Gelvin et al. | |
| 2011/0051656 A1 | 3/2011 | Hethuin et al. | |
| 2011/0069687 A1 | 3/2011 | Rezvani et al. | |
| 2011/0102171 A1 | 5/2011 | Raji et al. | |
| 2011/0109434 A1 | 5/2011 | Hadsall, Sr. | |
| 2011/0137614 A1 | 6/2011 | Wheeler et al. | |
| 2011/0298619 A1 | 12/2011 | O'Hare et al. | |
| 2011/0304437 A1 | 12/2011 | Beeler et al. | |
| 2011/0310779 A1 | 12/2011 | De Poorter et al. | |
| 2011/0310791 A1 | 12/2011 | Prakash et al. | |
| 2012/0008836 A1* | 1/2012 | Bobbitt | G06K 9/00771 382/113 |
| 2012/0014567 A1* | 1/2012 | Allegra | G06K 9/0057 382/118 |
| 2012/0038456 A1* | 2/2012 | Pikkarainen et al. | 340/5.61 |
| 2012/0039235 A1 | 2/2012 | Chen et al. | |
| 2012/0082062 A1 | 4/2012 | McCormack | |
| 2012/0092183 A1 | 4/2012 | Corbett et al. | |
| 2012/0092502 A1* | 4/2012 | Knasel | H04N 7/18 348/159 |
| 2012/0124367 A1 | 5/2012 | Ota et al. | |
| 2012/0127314 A1* | 5/2012 | Clements | 348/150 |
| 2012/0130632 A1 | 5/2012 | Bandyopadhyay et al. | |
| 2012/0131115 A1 | 5/2012 | Levell et al. | |
| 2012/0148102 A1* | 6/2012 | Moriguchi | G06T 7/277 382/103 |
| 2012/0158161 A1 | 6/2012 | Cohn et al. | |
| 2012/0159579 A1 | 6/2012 | Pineau et al. | |
| 2012/0160613 A1* | 6/2012 | Friedli | B66B 5/0012 187/384 |
| 2012/0182123 A1 | 7/2012 | Butler et al. | |
| 2012/0197986 A1 | 8/2012 | Chen et al. | |
| 2012/0201472 A1* | 8/2012 | Blanchflower et al. | 382/224 |
| 2012/0266168 A1 | 10/2012 | Spivak et al. | |
| 2012/0286929 A1* | 11/2012 | Kline | H04L 63/107 340/5.81 |
| 2012/0297049 A9* | 11/2012 | Alexander | H04L 63/1416 709/224 |
| 2012/0307051 A1* | 12/2012 | Welter | G08B 13/2482 348/143 |
| 2012/0310423 A1 | 12/2012 | Taft | |
| 2012/0311614 A1 | 12/2012 | Deanna et al. | |
| 2012/0324245 A1 | 12/2012 | Sinha et al. | |
| 2013/0003645 A1 | 1/2013 | Shapira et al. | |
| 2013/0035090 A1 | 2/2013 | Moshfeghi | |
| 2013/0041646 A1 | 2/2013 | Farley et al. | |

(56) References Cited

U.S. PATENT DOCUMENTS

| | | | |
|---|---|---|---|
| 2013/0042314 A1* | 2/2013 | Kelley | H04L 9/3215 726/9 |
| 2013/0055282 A1 | 2/2013 | Yi | |
| 2013/0064233 A1 | 3/2013 | Hethuin et al. | |
| 2013/0070745 A1 | 3/2013 | Nixon et al. | |
| 2013/0079028 A1 | 3/2013 | Klein | |
| 2013/0086195 A1 | 4/2013 | Hiniker | |
| 2013/0099919 A1 | 4/2013 | Cai et al. | |
| 2013/0117078 A1* | 5/2013 | Weik, III | E05F 15/70 705/13 |
| 2013/0163466 A1 | 6/2013 | Hughes et al. | |
| 2013/0219050 A1 | 8/2013 | Park et al. | |
| 2013/0239192 A1 | 9/2013 | Linga et al. | |
| 2013/0241744 A1 | 9/2013 | Erdos et al. | |
| 2013/0277430 A1 | 10/2013 | Zumsteg et al. | |
| 2013/0279409 A1 | 10/2013 | Dublin et al. | |
| 2013/0317659 A1 | 11/2013 | Thomas et al. | |
| 2013/0318529 A1 | 11/2013 | Bishop et al. | |
| 2013/0336230 A1 | 12/2013 | Zou et al. | |
| 2013/0346229 A1 | 12/2013 | Martin et al. | |
| 2014/0006165 A1 | 1/2014 | Grigg et al. | |
| 2014/0006586 A1 | 1/2014 | Hong et al. | |
| 2014/0015978 A1* | 1/2014 | Smith | G07C 9/253 348/156 |
| 2014/0035726 A1* | 2/2014 | Schoner | G06K 7/10366 340/8.1 |
| 2014/0052463 A1* | 2/2014 | Cashman | G06Q 10/1095 705/2 |
| 2014/0052832 A1 | 2/2014 | Dina et al. | |
| 2014/0063256 A1* | 3/2014 | Mongeon | H04N 7/18 348/150 |
| 2014/0071837 A1 | 3/2014 | Werb et al. | |
| 2014/0112126 A1 | 4/2014 | Claessens et al. | |
| 2014/0129135 A1 | 5/2014 | Holden et al. | |
| 2014/0139678 A1* | 5/2014 | Moriarty | G08B 13/19695 348/152 |
| 2014/0159910 A1 | 6/2014 | Lee et al. | |
| 2014/0173583 A1* | 6/2014 | Follis | G06F 9/44536 717/170 |
| 2014/0203071 A1 | 7/2014 | Eggert | |
| 2014/0222892 A1 | 8/2014 | Lee et al. | |
| 2014/0231502 A1 | 8/2014 | Marsico et al. | |
| 2014/0253706 A1 | 9/2014 | Noone et al. | |
| 2014/0267598 A1* | 9/2014 | Drouin | G03H 1/0005 348/40 |
| 2014/0285315 A1* | 9/2014 | Wiewiora | G07C 9/00158 340/5.53 |
| 2014/0324224 A1* | 10/2014 | Dolinshek | G05B 19/4147 700/275 |
| 2015/0074178 A1 | 3/2015 | Hong et al. | |
| 2015/0248299 A1 | 9/2015 | Rasband et al. | |
| 2015/0249588 A1 | 9/2015 | Leon et al. | |
| 2015/0257301 A1 | 9/2015 | Morgan et al. | |
| 2015/0287301 A1* | 10/2015 | Locke | G06N 5/027 348/156 |
| 2015/0356848 A1* | 12/2015 | Hatch | G08B 21/0261 340/539.13 |
| 2016/0057048 A1 | 2/2016 | Boudreaux | |
| 2016/0132653 A1* | 5/2016 | Baralay | G06F 19/345 705/2 |
| 2016/0241815 A1* | 8/2016 | Baxter | H04N 7/181 |
| 2016/0277261 A9 | 9/2016 | Ansari et al. | |
| 2016/0293218 A1* | 10/2016 | Hanis | G06K 7/10297 |
| 2016/0344841 A1 | 11/2016 | Wang et al. | |
| 2017/0193772 A1* | 7/2017 | Kusens | G06K 9/00208 |
| 2017/0225321 A1* | 8/2017 | Deyle | B25J 9/1679 |
| 2017/0270722 A1* | 9/2017 | Tse | G08B 21/18 |
| 2018/0107880 A1* | 4/2018 | Danielsson | G06T 7/292 |
| 2018/0130556 A1* | 5/2018 | Dobai | G16H 80/00 |
| 2018/0181794 A1* | 6/2018 | Benini | G06K 9/00228 |
| 2019/0043281 A1* | 2/2019 | Aman | A63G 31/16 |
| 2019/0141294 A1* | 5/2019 | Thorn | G06K 9/00369 |
| 2020/0019921 A1* | 1/2020 | Buibas | G06Q 10/087 |
| 2020/0066129 A1* | 2/2020 | Galvez | G01C 21/20 |
| 2020/0394568 A1* | 12/2020 | Chuaypradit | G06Q 10/02 |
| 2021/0110666 A1* | 4/2021 | Thomas | G07F 17/3276 |
| 2021/0174952 A1* | 6/2021 | Leong | G16H 40/63 |
| 2023/0009081 A1* | 1/2023 | Paripally | G06V 20/00 |
| 2023/0206711 * | 6/2023 | Pinheiro | G07C 9/27 340/5.6 |

FOREIGN PATENT DOCUMENTS

| | | | |
|---|---|---|---|
| CN | 1672060 A | 9/2005 | |
| CN | 1871782 A | 11/2006 | |
| CN | 1922576 A | 2/2007 | |
| CN | 1981313 A | 6/2007 | |
| CN | 101067843 A | 11/2007 | |
| CN | 101199187 A | 6/2008 | |
| CN | 101364734 A | 2/2009 | |
| CN | 101764759 A | 6/2010 | |
| CN | 101951341 A | 1/2011 | |
| CN | 101976377 A | 2/2011 | |
| CN | 101977124 A | 2/2011 | |
| CN | 102035738 A | 4/2011 | |
| CN | 102170360 | 8/2011 | |
| CN | 102316053 A | 1/2012 | |
| CN | 102325075 A | 1/2012 | |
| CN | 102438333 | 5/2012 | |
| CN | 102665196 | 9/2012 | |
| CN | 202475489 U | 10/2012 | |
| CN | 103139019 A | 6/2013 | |
| CN | 103170071 A | 6/2013 | |
| CN | 203057531 U | 7/2013 | |
| CN | 103282886 A | 9/2013 | |
| CN | 203368600 U | 12/2013 | |
| CN | 103813408 | 5/2014 | |
| CN | 104168648 | 11/2014 | |
| EP | 724235 A2 * | 7/1996 | G07C 9/00 |
| EP | 0 814 393 | 12/1997 | |
| EP | 1 718 095 | 11/2006 | |
| EP | 1 885 039 | 2/2008 | |
| EP | 1 885 039 A2 | 2/2008 | |
| EP | 2 037 426 A1 | 3/2009 | |
| JP | 2005-292942 A | 10/2005 | |
| JP | 2007193558 A * | 8/2007 | |
| JP | 2008-090861 A | 4/2008 | |
| KR | 10-2005-0054914 | 4/2007 | |
| KR | 10-2007-0105430 A | 10/2007 | |
| KR | 10-2013-0143262 A | 12/2013 | |
| WO | WO-01/06401 A1 | 1/2001 | |
| WO | WO-01/26329 A2 | 4/2001 | |
| WO | WO-2004/068855 A1 | 8/2004 | |
| WO | WO-2007/002763 | 1/2007 | |
| WO | WO-2007/018523 | 2/2007 | |
| WO | WO-2008/139203 | 11/2008 | |
| WO | WO-2009/017687 A1 | 2/2009 | |
| WO | WO-2009/079036 A1 | 6/2009 | |
| WO | WO-2012/138133 | 10/2012 | |
| WO | WO-2013/091678 A1 | 6/2013 | |
| WO | WO-2013/159217 A1 | 10/2013 | |
| WO | WO-2015/130654 A1 | 9/2015 | |

OTHER PUBLICATIONS

Chinese Office Action dated May 30, 2018 in corresponding application No. 201580016948.9.

Cheng, Research on AODV Routing Protocol of Wireless Network, Chinese Master's Theses Full-Text Database, Information Technology Division, Jul. 15, 2007, 79 pages.

First Office Action for Chinese Application No. 201580015282.5, dated Sep. 4, 2018, 18 pages.

Office Action for U.S. Appl. No. 15/402,423, dated Jul. 26, 2018, 10 pages.

Office Action for Chinese Application No. 201580013946.4, dated Jul. 31, 2018, 15 pages.

Office Action on U.S. Appl. No. 15/366,036 dated May 31, 2018. 5 pages.

U.S. Appl. No. 61/946,054.

U.S. Appl. No. 61/973,962.

(56) References Cited

OTHER PUBLICATIONS

Asada et al, Wireless Integrated Network Sensors (WINS) Proceedings of the Spie, Spie, Bellingham, VA, vol. 3673, dated Mar. 1, 1999, pp. 11-18.
Atchley, Scott, Routing Heterogeneous CCI Subnets, 2013 8 pages.
Bhatti et al., MANTIS OS: An Embedded Multithreaded Operating System for Wireless Micro Sensor Platforms, Aug. 1, 2005, 14 pages.
C. Perkins et al: Ad hoc On-Demand Distance Vector (AODV) Routing, RFC3561, Jul. 2007(Jul. 1, 2007), pp. 1-37.
Communication pursuant to Article 94(3) EPC, 15754691.2, Tyco Fire & Security GmbH, Dec. 9, 2018.
Depoorter, Eli, et al., Enabling Direct Connectivity Between Heterogeneous Objections in the Internet of Things Through a Network Service Oriented Architecture, http://jwcn.eurasigjournals.com/content/pdf/1687-1499-2011-61.pdf, dated Aug. 31, 2011, 14 pages.
Dong et al., "SenSpire OS: A Predictable, Flexible, and Efficient Operating System for Wireless Sensor Networks," IEEE Transactions on Computers, IEEE, USA, vol. 60, No. 12, Dec. 1, 2011, pp. 1788-1801.
Dunkels et al., "Contiki—a lightweight and flexible operating system for tiny networked sensors", Computational Systems Bioinformatics Conference, 2004. CSB 2004. Proceedings. 2004 IEEE Tampa, FL, USA, Nov. 16-18, 2004, Los Alamitos, CA, USA, IEEE (Comput. Soc, US), Nov. 16, 2004, pp. 455-462.
Eugster et al., "The many faces of publish/subscribe," ACM computing surveys (CSUR) 35.2, 2003, pp. 114-131.
Examination Report for European Application No. 15754691.2, dated Sep. 12, 2018, 7 pages.
Extended European Search Report on EP 15755330.6, dated Oct. 25, 2017, 11 pages.
FIREWALL.CX Subnet Routing & Communications, http://www.firewall.cx/networkinq-topics/protocols/ip-subnettinq/170-subnetting-routing.html, 2000-2014, 9 pages.
Galos et al., "Dynamic reconfiguration inwireless Sensor Networks," Electronics, Circuits, and Systems (ICECS), 2010 17th IEEE International Conference on, IEEE, Dec. 12, 2010, pp. 918-921.
Gopinath et al, A Gateway Solution for IPV6 Wireless Sensor Networks, International Conference on Ultra Modern Communications (ICUMT), Oct. 12-14, 2009, IEEE, pp. 1-6.
Hill et al, The Platforms Enabling Wireless Sensor Networks, Communications of the ACM, dated Jun. 2004, vol. 47, No. 6, 6 pages.
Hunkeler et al., "MQTT-S—A publish/subscribe protocol for Wireless Sensor Networks," 2008 3rd International Conference on Communication Systems Software and Middleware and Workshops (COMSWARE'08), IEEE, 8 pages.
IEI International Electronics, Tech Note 4.1, dated Nov. 28, 2005, 2 pages.
International Extended Search Report on PCT/US00/27515, dated Oct. 18, 2001, 14 pages.
International Search Report and Writt4en Opinion on PCT/US2015/017470, dated Jun. 9, 2015 13 pages.
International Search Report and Written Opinion on PCT/US15/017251, dated May 29, 2015, 21 pages.
International Search Report and Written Opinion on PCT/US15/17470, dated Jun. 9, 2016, 39 pages.
International Search Report and Written Opinion on PCT/US15/17477, dated Jun. 10, 2015, 11 pages.
International Search Report and Written Opinion on PCT/US15/17481, Jun. 10, 2015, 11 pages.
International Screen Search Report and Written Opinion on PCT/US15/17491, dated Jun. 10, 2015, 16 pages.
International Search Report and Written Opinion on PCT/US15/17680, dated Jun. 24, 2015, 12 pages.
International Search Report and Written Opinion on PCT/US15/17688, dated Jun. 8, 2015, 10 pages.
International Search Report and Written Opinion on PCT/US15/17696 dated Jun. 8, 2015, 12 pages.
International Search Report and Written Opinion on PCT/US15/17702 dated Jun. 17, 2015, 16 pages.
International Search Report and Written Opinion on PCT/US15/17924, dated Jun. 5, 2015, 7 pages.
International Search Report and Written Opinion on PCT/US15/17931 dated Jun. 10, 2015, 11 pages.
International Search Report and Written Opinion on PCT/US2015/017212, dated Jun. 2, 2015.
International Search Report and Written Opinion on PCT/US2015/017212, dated Jun. 2, 2015, 10 pages.
International Search Report and Written Opinion on PCT/US2015/017251, dated May 29, 2015, 19 pages.
International Search Report and Written Opinion on PCT/US2015/017251, dated May 29, 2015, 35 pages.
International Search Report and Written Opinion on PCT/US2015/017477, dated Jun. 10, 2015, 11 pages.
International Search Report and Written Opinion on PCT/US2015/017481, dated Jun. 10, 2015, 10 pages.
International Search Report and Written Opinion on PCT/US2015/017491, dated Jun. 10, 2015, 15 pages.
International Search Report and Written Opinion on PCT/US2015/017688, dated Jun. 8, 2015, 10 pages.
International Search Report and Written Opinion on PCT/US2015/017696, dated Jun. 8, 2015, 16 pages.
International Search Report and Written Opinion on PCT/US2015/017702, dated Jun. 17, 2015, 16 pages.
International Search Report and Written Opinion on PCT/US2015/017924, dated Jun. 5, 2015, 12 pages.
International Search Report and Written Opinion on PCT/US2015/0I7221, dated May 26, 2015, 11 pages.
Koshy et al. "Remote incremental linking for energy-efficient reprogramming of sensor networks," Wireless Sensor Networks, 2005, Proceeedings of the Second European Workshop on Istanbul, Turkey, Jan. 31-Feb. 2, 2005, Piscataway, NJ, USA, IEEE, US, Jan. 31, 2005, pp. 354-365.
Marron et al., "FlexCup: A Flexible and Efficient Code Update Mechanism for Sensor Networks," Jan. 1, 2006, Wireless Sensor Networks Lecture Notes in Computer Science; LNCS, Springer, Berlin, DE, pp. 212-227.
McIntire et al, "The low power energy aware processing (LEAP) embedded networked sensor system," Information Processing in Sensor Networks, 2006. IPSN 2006. The Fifth International Conference, Nashville, TN, USA, Apr. 19-21, 2006, Piscataway, NJ, USA, IEEE, 2 Penn Plaza, Suite 701 New York, NY, 10121-0701, USA, Apr. 19, 2006, pp. 449-457.
Microsoft, IPv6 Traffic Between Nodes on Different Subnets of an IPv4 Internetwork, Microsoft Windows XP, http://www.microsoft.com/resources/documentation/windows/xp/all/proddocs/en-us/sag_ip_v6_imp_conf6.mspx?mfr=true, dated Jun. 15, 2014, 5 pages.
Office Action on Chinese Patent Application No. 201580019697, dated May 17, 2018. 1 page.
Office Action on CN 201580013943.0, dated Mar. 21, 2019, 20 pages with translation.
Office Action on CN 201580013946.4, dated May 8, 2019, 9 pages with translation.
Office Action on CN 201580015274.0, dated Feb. 3, 2019, 13 pages with translation.
Office Action on CN 201580015274.0, dated Jul. 3, 2019, 11 pages with translation.
Office Action on CN 201580016167.X, dated May 2, 2018, 20 pages with translation.
Office Action on CN 201580016167.X, dated Sep. 3, 2019, 18 pages with translation.
Office Action on CN 201580016167.X, dated Mar. 18, 2019, 26 pages with translation.
Office Action on CN 201580019382.5, dated Jul. 31, 2019, 17 pages with translation.
Office Action on CN 201580019386.3, dated Jun. 4, 2019, 34 pages with translation.
Office Action on CN 201580019691.2, dated Apr. 29, 2019, 15 pages with translation.
Office Action on CN 201580019691.2, dated Oct. 29, 2019, 10 pages with translation.

(56) References Cited

OTHER PUBLICATIONS

Office Action on CN 201580019697.X, dated Feb. 26, 2019, 20 pages with translation.
Office Action on CN 201580020164.3 dated Mar. 27, 2019, 24 pages with translation.
Office Action on CN 201580021841.3, dated Jun. 26, 2019, 16 pages with translation.
Office Action on EP 15754691.2, dated May 10, 2019, 5 pages.
Office Action on EP 15754909.8, dated May 20, 2019, 6 pages.
Office Action on EP 15754909.8, dated Sep. 11, 2018, 5 pages.
Office Action on EP 15755018.7, dated Jul. 9, 2019, 6 pages.
Office Action on EP 15755018.7, dated Sep. 11, 2018, 5 pages.
Office Action on EP 15755117.7, dated Aug. 9, 2019, 6 pages.
Office Action on EP 15755117.7, dated Oct. 4, 2018, 6 pages.
Office Action on EP 15755330.6, dated Jun. 19, 2019, 6 pages.
Office Action on EP 15755330.6, dated Oct. 1, 2018, 5 pages.
Office Action on EP 15755456.9, dated Mar. 7, 2019, 5 pages.
Office Action on EP 15755880.0, dated Jan. 30, 2019, 5 pages.
Shah Bhatti et al., "MANTIS OS: An Embedded Multithreaded Operating System for Wireless Micro Sensor Platforms," Mobile Networks and Applications, Kluwer Academic Publishers, BO, vol. 10, No. 4, Aug. 1, 2005, pp. 563-579.
Supplementary European Search Report on EP 15754419.8, dated Nov. 14, 2017, 6 pages.
Supplementary European Search Report on EP 15754691.2, dated Nov. 3, 2017, 26 pages.
Supplementary European Search Report on EP 15754818.1, dated Dec. 14, 2017, 8 pages.
Supplementary European Search Report on EP 15754909.8, dated Nov. 7, 2017, 10 pages.
Supplementary European Search Report on EP 15755117.7, dated Nov. 7, 2017, 10 pages.
Supplementary European Search Report on EP 15755215.9, dated Nov. 20, 2017, 6 pages.
Supplementary European Search Report on EP 15755293.6, dated Sep. 5, 2017, 15 pages.
Supplementary European Search Report on EP 15755456.9, dated Nov. 22, 2017, 5 pages.
Supplementary European Search Report on EP 15755714.1, dated Oct. 25, 2017, 11 pages.
Supplementary European Search Report on EP 15755714.1, dated Oct. 25, 2017, 8 pages.
Supplementary European Search Report on EP 15755880.0, dated Nov. 24, 2017, 7 pages.
Supplementary European Search Report on EP 15756099.6, dated Oct. 26, 2017, 18 pages.
The Internet Society, Transmission of IP over InfiniBand (IPoIB), http://www.networksorcery.com/enp/rfc/rfc4391.txt, dated Apr. 2006, 15 pages.
Zhou, Ying et al., "Mobile Agent-based Policy Management for Wireless Sensor Networks,", Wireless Communications, Networking and Mobile Computing, 2005, Proceedings 2005 Int'l Conference on Wuhan, China, vol. 2, Sep. 23, 2005, pp. 1207-1210.
Zoumboulakis et al., "Active rules for sensor databases," Proceedings of the 1st international workshop on Data management for sensor networks, in conjunction with VLDB 2004, ACM, 2004, 6 pages.
Chen et al., Enix: a lightweight dynamic operating system for tightly constrained wireless sensor platforms, Proceedings of the 8th ACM Conference on Embedded Networked Sensor Systems, dated Nov. 3, 2010, 14 pages. http://sensys.acm.org/2010/Papers/p183-Chen.pdf.
International Search Report and Written Opinion on PCT/US15/017450, dated Jun. 10, 2015, 6 pages.
International Search Report and Written Opinion on PCT/US15/017477, dated Jun. 10, 2015, 7 pages.
International Search Report and Written Opinion on PCT/US15/017481, dated Jun. 10, 2015, 6 pages.
International Search Report and Written Opinion on PCT/US15/017491, dated Jun. 10, 2015, 6 pages.
International Search Report and Written Opinion on PCT/US15/017931, dated Jul. 10, 2015, 6 pages.
International Search Report and Written Opinion on PCT/US15/024050, dated Jul. 20, 2015, 8 pieces.
International Search Report and Written Opinion on PCT/US2015/017221, dated May 26, 2015, 11 pages.
International Search Report and Written Opinion on PCT/US2015/017450, dated Jun. 10, 2015, 11 pages.
Office Action on CN 201580019691.2, dated May 4, 2018, 14 pages including translation.
Office Action on CN 201580026024.7, dated Jun. 4, 2019, 12 pages with translation.
Office Action on JP 2016-560736, dated Aug. 27, 2019, 5 pages with translation.
Office Action on JP 2016-560736, dated Feb. 5, 2019, 5 pages with translation.
International Search Report and Written Opinion on PCT/US2015/024050, dated Jul. 20, 2015, 12 pages.
Supplementary European Search Report on EP 15755018.7, dated Oct. 26, 2017, 9 pages.
Supplementary European Search Report on EP 15755417.1, dated Oct. 23, 2017, 14 pages.
Supplementary European Search Report on EP 15774423, dated Nov. 17, 2017, 1 page.
Supplementary European Search Report on EP 15774423.6, dated Nov. 28, 2017, 10 pages.
Office Action on CN 201580013946.4, dated Jan. 19, 2020, 18 pages with English language translation.
Office Action on CN 201580015274.0, dated Feb. 7, 2020, 6 pages with English language translation.
Office Action on CN 201580016167.X, dated Mar. 2, 2020, 13 pages with English language translation.
Office Action on CN 201580019382.5, dated Apr. 24, 2020, 12 pages with English language translation.
Office Action on CN 201580019386.3, dated May 7, 2020, 10 pages with English language translation.
Office Action on CN 201580021841.3, dated Mar. 16, 2020, 10 pages with English language translation.
Office Action on CN 201580022068.2, dated Jan. 22, 2020, 15 pages with English language translation.
Office Action on EP 15754818.1, dated Dec. 19, 2019, 6 pages.
Office Action on EP 15755714.1, dated Jan. 17, 2020, 5 pages.
Office Action on EP 15774423.6, dated Jan. 7, 2020, 6 pages.
Office Action on JP 2016-560736, dated Jan. 15, 2020, 4 pages with English language translation.
Pu, Performance Analysis and Application Research on Wireless Network Coding System based on broadcast advantage, Chinese Doctoral Theses Full-text Database, Information Technology Division, Mar. 2010, pp. 25-79.
Qiang, Research on Wireless Sensor Network Routing Algorithm based on Dense Deployment. Chinese Master's Theses Full-text Database, Information Technology Division, May 2011, pp. 6-33.
Extended European Search Report on EP 20168200.2, dated Jul. 13, 2020, 11 pages.
Office Action on EP 15755018.7, dated Jun. 23, 2020, 5 pages.
Office Action on JP 2016-560736, dated Aug. 25, 2020, 6 pages with translation.
Bhatti et al., "MANTIS OS: An Embedded Multithreaded Operating System for Wireless Micro Sensor Platforms," Mobile Networks and Applications (MONET) Journal, Special Issue on Wireless Sensor Networks, Aug. 2005, 14 pages.
Office Action on CN 201580019386.3, dated Jan. 6, 2021, 18 pages, with English language translation.
Office Action on KR 10-2016-7026932, dated Dec. 21, 2020, 5 pages.
Office Action on KR 10-2016-7026940, dated Dec. 18, 2020, 8 pages.
Office Action on KR 10-2016-7026962, dated Dec. 18, 2020, 3 pages.
Zhou Ying et al., "Mobile Agent-based Policy Management for Wireless Sensor Networks," 2005 International Conference on Wireless Communications, Networking and Mobile Computing, Sep. 26, 2005, 4 pages.

(56) References Cited

OTHER PUBLICATIONS

Office Action on CN 201580013946.4, dated Sep. 25, 2020, 13 pages with English translation.
Office Action on KR 10-2016-7026933 dated Oct. 13, 2020, 12 pages with English translation.
Liang, "Social Network Service," Mar. 31, 2013, pp. 137-138. English language translation unavailable.
Office Action on CN 201580022068.2, dated Aug. 26, 2020, 13 pages with English translation.
Office Action on EP 15774423.6, dated Oct. 6, 2020, 5 pages.
Office Action on KR 10-2016-7030734, dated Mar. 25, 2021, 16 pages with English language translation.
Office Action on EP 15755293.6, dated Feb. 3, 2021, 10 pages.
Office Action on CN 201580021841.3, dated Mar. 8, 2021, 15 pages with English language translation.
Office Action on CN 201580022068.2, dated Mar. 2, 2021, 7 pages, with English translation.
Office action on KR 10-2016-7026929, dated Mar. 16, 2021, 34 pages with English translation.
Yu, Zhaochun, "Development of Study on Data Storage and Access in Wireless Sensor Network," Chinese Journal of Electronics, vol. 36, No. 10, 10 pages.
Zhang, Huixiang, "Network Control and Application," Press of Northwest Polytechnical University, p. 41, Aug. 2013, 4 pages.
Office Action on EP 15755117.7, dated Jan. 13, 2021, 4 pages.
Dunkels et al., "Conticki—a lightweight and flexible operating system for tiny networked sensors," 29th Annual IEEE International Conference on Local Computer Networks, Nov. 16-18, 2004, pp. 455-462.
Office Action on KR 10-2016-7026981, dated May 30, 2021, 11 pages with English language translation.
Office Action on KR 10-2016-7026998, dated Jun. 30, 2021, 18 pages with English language translation.
European Office Action on EP Appl. No. 15755714.1 dated Mar. 9, 2023 (3 pages).
European Office Action on EP Appl. No. 20168200.2 dated Feb. 28, 2022 (5 pages).
European Office Action on EP Appl. No. 15755714.1 dated Jan. 25, 2022 (5 pages).
Korean Office Action on KR Appl. No. 10-2016-7026934 dated Jan. 10, 2022 (12 pages with English language translation).
Korean Office Action on KR Appl. No. 10-2016-7026946 dated Jan. 17, 2022 (10 pages with English language translation).
Korean Office Action on KR Appl. No. 10-2016-7026964 dated Jan. 12, 2022 (12 pages with English language translation).
European Office Action on EP Appl. No. 20168200.2 dated Jun. 5, 2023 (5 pages).

* cited by examiner

CORRELATION OF SENSORY INPUTS TO IDENTIFY UNAUTHORIZED PERSONS

CLAIM OF PRIORITY

This application claims priority under 35 U.S.C. § 119(e) to provisional U.S. Patent Application 61/973,962, filed on Apr. 2, 2014, entitled: "Wireless Sensor Network", and provisional U.S. Patent Application 61/946,054, filed on Feb. 28, 2014, entitled: "Wireless Sensor Network", the entire contents of which are hereby incorporated by reference.

BACKGROUND

This description relates to operation of sensor networks such as those used for security, intrusion and alarm systems installed on commercial or residential premises.

It is common for businesses and homeowners to have a security system for detecting alarm conditions at their premises and signaling the conditions to a monitoring station or to authorized users of the security system. Security systems often include an intrusion detection panel that is electrically or wirelessly connected to a variety of sensors. Those sensors types typically include motion detectors, cameras, and proximity sensors (used to determine whether a door or window has been opened). Typically, such systems receive a very simple signal (electrically open or closed) from one or more of these sensors to indicate that a particular condition being monitored has changed or become unsecure.

Typical intrusion systems can be set up to monitor entry doors in a building. When the door is secured, the proximity sensor senses a magnetic contact and produces an electrically closed circuit. When the door is opened, the proximity sensor opens the circuit, and sends a signal to the panel indicating that an alarm condition has occurred (e.g., an opened entry door). Government entities, companies, academic institutions, etc. issue credentials to employees, contractors, students, etc. to control access to buildings and facilities, indoors and outdoors. Individuals who bypass security systems to gain access, either intentionally or unintentionally, are difficult to identify and locate.

SUMMARY

Prior solutions regarding credentials have focused on technologies such as video surveillance to address access problems. Once a person has gained access, however, it is difficult to impossible to distinguish between those with valid credentials and those without valid credentials.

According to an aspect of a system for physical intrusion detection/alarm monitoring includes one or more computing devices, including processor devices and memory in communication with the processor devices, configured to correlate sensory input from credentials or badges with video, receive sensory inputs from credentials or badges within a monitored premises, receive video information from cameras and other image capture devices disposed throughout the premises, and continually correlate the received sensory inputs from these credentials or badges with the received video.

One or more of the following are some of the embodiments within the scope of this aspect. system is further configured to apply one or more algorithms to detect the presence of a possible non-credentialed individual and track at least the non-credentialed individual and produce an alert to send to a control center to alert authorities to the location of the non-credentialed individual. The system is further configured to apply video recognition to identify the number of people in a certain area and correlate that data with data from one or more remote badge readers to identify the appropriately number of badged individuals in a group of individuals within a monitored area. The system is further configured to determine a mismatch between the number of individuals in the area and a number of read badges or credentials. The system is further configured to continually track all individuals and their movements throughout the premises, correlate those movements with different readings of valid credentials or badges to isolate one or more non-credentialed individuals. The one or more computing devices include an application layer that executes routines to provide node functions that can be dynamically changed. At least some of the nodes are cameras and others are credential readers. Certain of the nodes are configured to apply video recognition to frames of captured video to recognize features that correspond to individuals appearing in the captured frames and determine a number of people within the image. In one or more of the certain nodes, the one or more of the certain nodes are configured to change the video recognition algorithm that is applied to find features that correspond to a number of individuals. The system is further configured to correlate paths taken by different individuals with different readings of valid credentials or badges from the same or different sets of cameras/readers.

One or more aspects may provide one or more of the following advantages.

By correlating sensory input from credentials or badges that use technologies such as RFID, Bluetooth low energy (BLE), MAC addresses from cell phones, NFC, etc. with video; individuals without valid credentials can be identified and tracked. Video recognition is used to identify the number of people in a certain area. A remote reading badge is used to identify the appropriately badged employees by tracking the personnel movement and correlating that with the movement of the valid ID. Once the non-badged individual is segregated from the valid personnel, biometrics such as face, iris or just video recognition are used to track the individual(s) and allow authorities to intervene.

The details of one or more embodiments of the invention are set forth in the accompanying drawings and the description below. Other features, objects, and advantages of the invention is apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
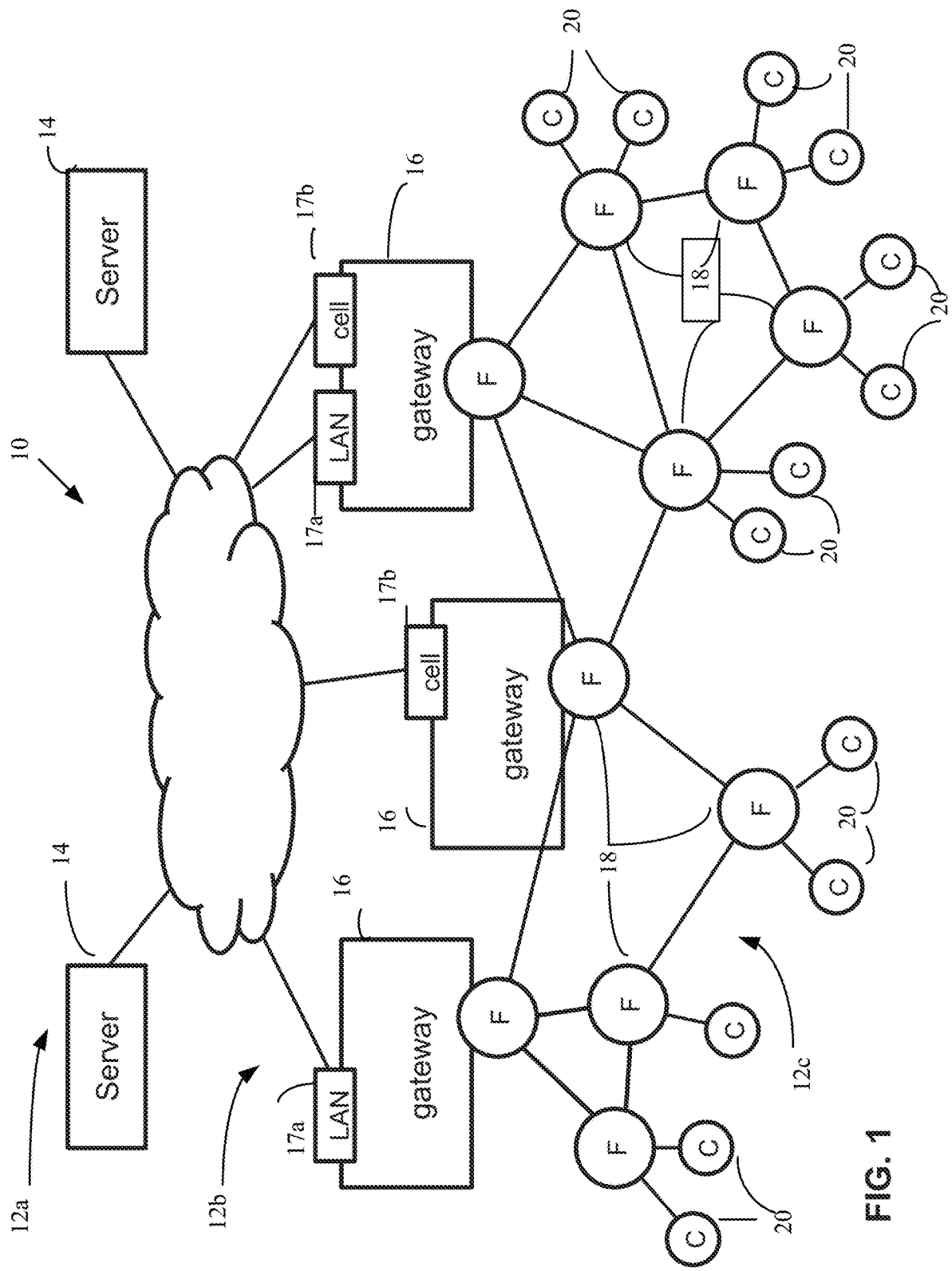
FIG. 1 is a schematic diagram of an exemplary networked security system.

Referring now to FIG. 1, an exemplary (global) distributed network 10 topology for a Wireless Sensor Network (WSN) is shown. In FIG. 1 the distributed network 10 is logically divided into a set of tiers or hierarchical levels 12a-12c.

In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Constrained computing devices 20 as used herein are devices with substantially less persistent and volatile memory other computing devices, sensors in a detection system. Currently examples of constrained devices would be those with less than about a megabyte of flash/persistent memory, and less than 10-20 kbytes of RAM/volatile memory). These constrained devices 20 are configured in this manner; generally due to cost/physical configuration considerations.

In a typical network, the edge (wirelessly-connected) tier of the network is comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop network layer) connections between devices. A formal networking layer (that functions in each of the three tiers shown in FIG. 1) uses a series of these direct links together with routing devices to send messages (fragmented or non-fragmented) from one device to another over the network.

The WSN 10 implements a state machine approach to an application layer that runs on the lower tier devices 18 and 20. Discussed below is an example of a particular implementation of such an approach. States in the state machine are comprised of sets of functions that execute in coordination, and these functions can be individually deleted or substituted or added to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferable without rebooting of the edge devices.

Figure 2:
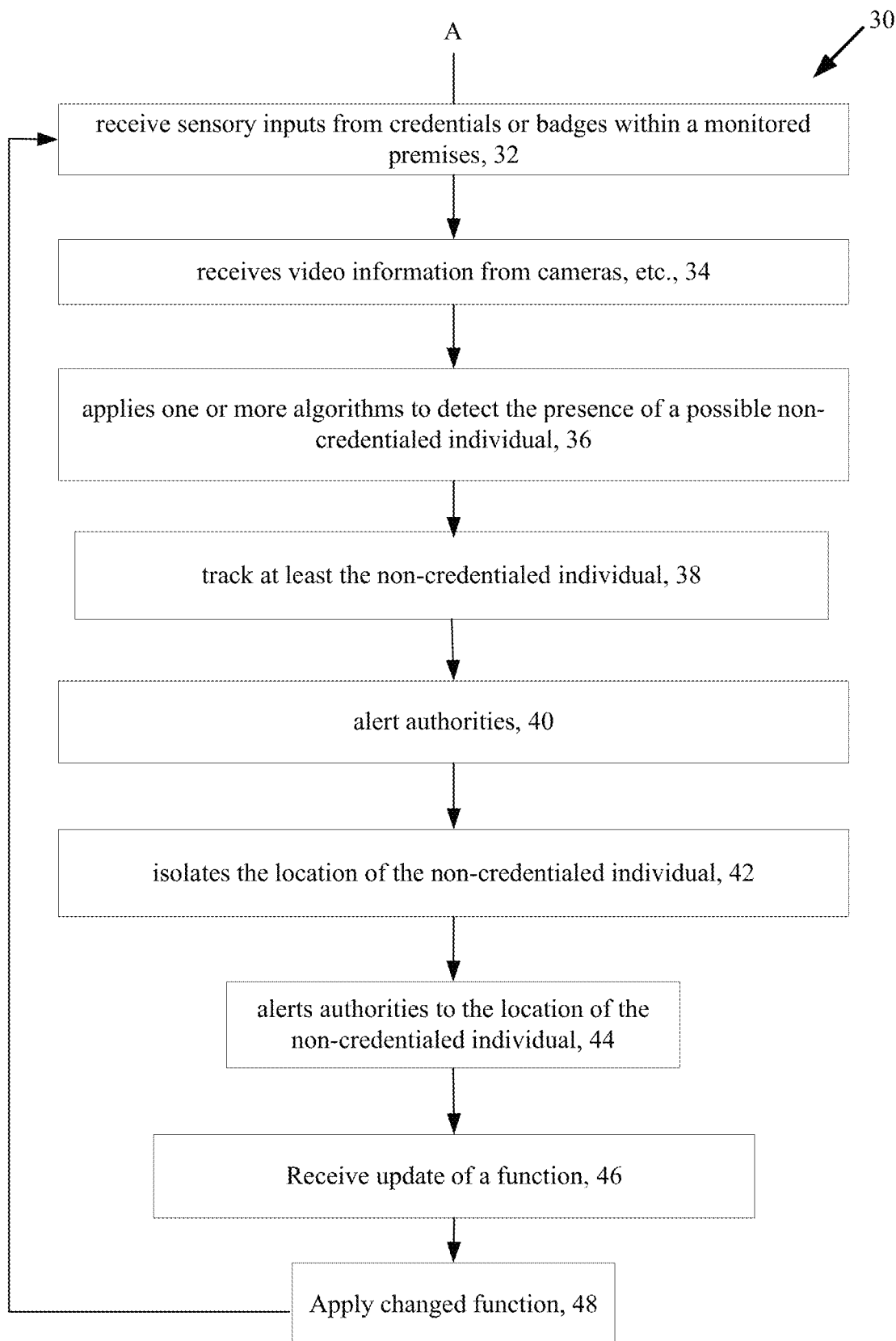
FIG. 2 is a flow chart of a correlation algorithm.

Referring now to FIG. 2 a process 30 that executes on one or more computers disposed within the distributed network 10 is shown. In alternative arrangements, the process 30 can be used in any other arrangement besides the distributed network 10 described above provided that video data and sensed credential data are supplied to the computer(s). The process 30 correlates sensory input from credentials or badges that use technologies such as RFID, Bluetooth low energy (BLE), MAC addresses from cell phones, NFC, etc. with captured video.

The process 30 executes on the one or more computers, and receives 32 sensory inputs from credentials or badges within a monitored premises. Sensors such as some of the nodes in FIG. 1 sense the presence of a credential tag typically carried by an individual passing through a range of the sensor. These sensors receive signals from badge/tag devices that incorporate circuitry operative using radio frequency identification (RFID), Bluetooth® low energy peer to peer devices, MAC addresses from cell phones, and near field communication (NFC) devices operative using a set of standards for smartphones and similar devices to establish radio communication with each other by touching them together or bringing them into proximity, etc. that are dispersed throughout a monitored premises. The process 30 also receives 34 video information from cameras and other image capture devices that are disposed throughout the premises. The process 30 continually applies one or more algorithms to detect the presence of a possible non-credentialed individual to continually correlate the received sensory inputs from these credentials or badges, etc. with the received video.

The process 30 seeks to track individuals, especially individuals without valid credentials or badges for a particular monitored area. The process 30 applies one or more algorithms that detect the presence of a possible non-credentialed individual, tracks 38 at least the non-credentialed individual, alerts 40 authorities of the presence of a non-credentialed individual within the premises, and continually processing of inputs to isolate tracking of the non-credentialed individual to a particular, e.g., pinpoint location and alert 42 authorities to the isolated location of the non-credentialed individual.

During processing in FIG. 2, various ones of the nodes in FIG. 1 can be brought to bear on tracking of the non-credentialed individual or generally tracking of credentialed individuals. Thus, the servers of FIG. 1 or other systems can generate updates to functions (not shown) that are performed at the lower tiers, these nodes can receive 46 these new or updated functions and apply 48 the changed function to processing of FIG. 2.

Figure 3:
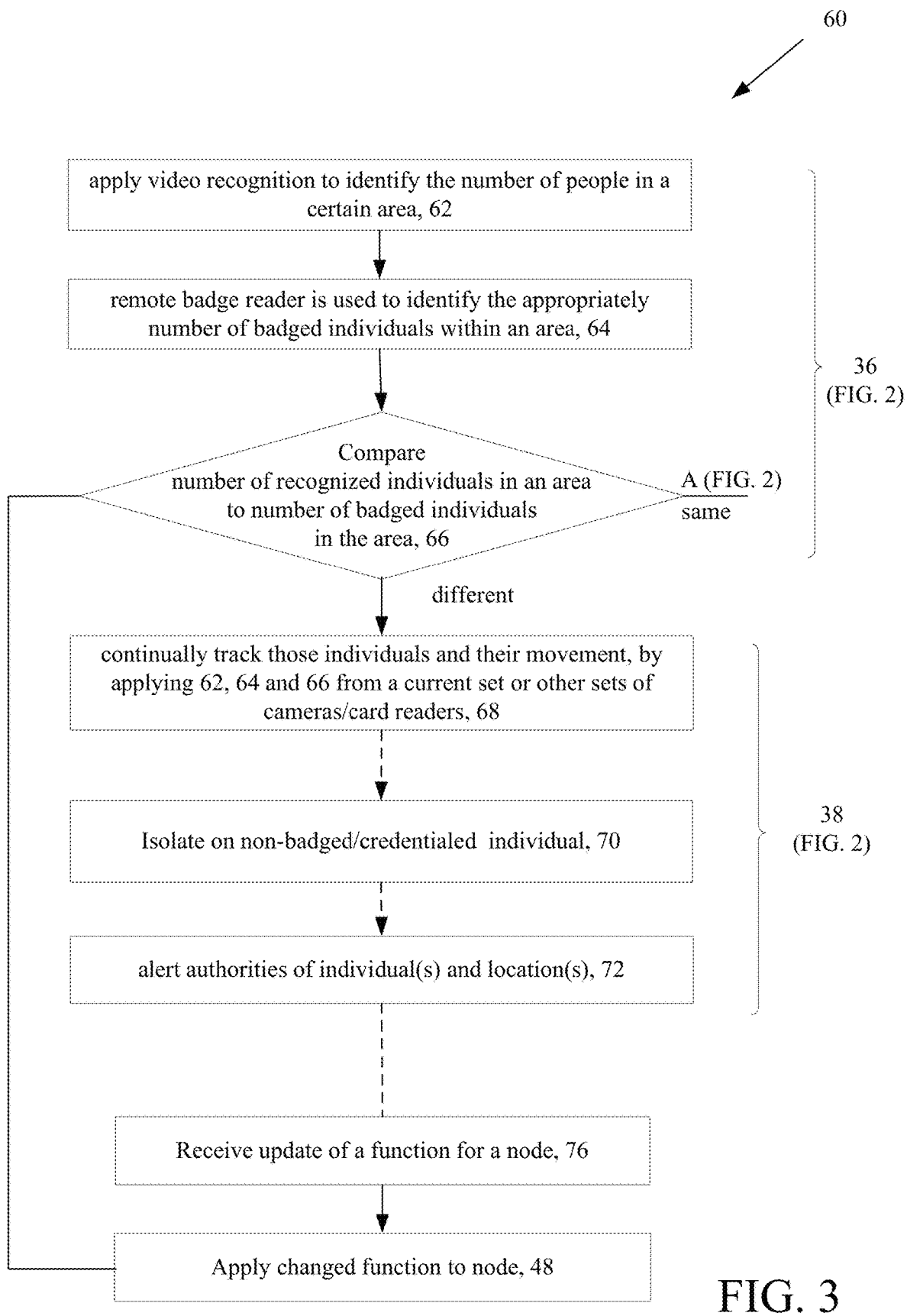
FIG. 3 is flow chart of an example tracking process.

Referring now to FIG. 3 an example of algorithmic processing 60 for the tracking process 30 of FIG. 3, is shown. Cameras dispersed without the premises being monitored. Generally, the processing 36 of FIG. 2 is shown with details. One camera in an area captures video and applies 62 video recognition to frames of captured video. The video recognition is used to recognize features that correspond to, e.g., individuals appearing in the captured frames. The video recognition determines a number of people with the image, where the image is correlated to the area captured by the camera. At this junction the video recognition that is applied can be rather coarse to conserve processing or allow such processing to be performed at nodes within the lower tier, as it merely needs to find features that correspond to a number of individuals.

A remote badge reader that can be one of the nodes in the network 10 has a range that coincides, or overlaps or otherwise can be correlated to the area that was captured in the video frames. This remote badge reader and camera can be considered as a current set.

The computer(s) receives 64 badge/tag data from those individuals that are within the range of operation of the badge reader. The remote badge reader and/or computer(s) determines 66 the number of badged individuals that pass through the region within the range of operation of the remote badge reader. If the area captured by the remote badge reader coincides with the area captured by the camera, this data can be processed, otherwise they may be some correlation (not shown) need to correlate the area captured in the video frames with the area within the range of the card reader.

The computer compares the number of recognized individuals in frames to the number of received badges from the reader. If the process 60 determines that there is a mismatch between the number of individuals in the area and a number of badges (or credentials), the process 60 continues (generally, the processing 38 of FIG. 2) to track 68 all of those individuals and their movements throughout the premises by continually applying 62 video recognition to frames of captured video, receive 64 badge/tag and determining 66 the number of badged individuals that pass through the region within the range of badge readers with respect to the number of recognized individuals, using either the current set of cameras/readers or different sets of cameras/readers, as needed. At this juncture, the process could send requests for updated algorithms, as is discussed below for both the overall process (as in FIG. 2) or to update nodes for different node-level processing and sensing (FIG. 3).

The process 60 correlates the paths taken by different individuals with different readings of valid credentials or badges from the same or different sets of cameras/readers.

For example, at this junction more sophisticated recognition algorithms, e.g., facial recognition, etc. can be used. In addition, processing algorithms can be sent to other nodes in the network to train process on the tracked individuals where the nodes that are send these algorithms are selected based on an estimation or prediction of direction/paths of travel through the premises.

At some point as individuals come and go, a non-badged/credentialed individual can be isolated individually or to a small group, and then the process will focus tracking on that individual. At any point in processing where there is a discrepancy an alarm can be raised. As the process detects the presence of new individuals and detects the departure of previously tracked individuals from the group of individuals, the process is still continually tracking the one or more individuals without valid credentials. Newly added individuals can be recognized in the video captured, especially if more intensive algorithms are used, and departing individuals can be noted by a valid reading of their tags/credentials. If an individual departs without a valid tag read, when is should have been read, that person is most likely the non-credentialed individual.

As previously mentioned, using the network 10 of FIG. 1, it is possible during processing that various ones of the nodes in FIG. 1 are brought to bear on tracking of FIG. 2. Thus, the servers of FIG. 1 or other systems can generate updates to functions (not shown) that are performed at the lower tiers e.g., such nodes. These nodes at the lower tier receive 46 these new or updated functions and apply 48 the changed function to the processing performed by the nodes within processing of FIG. 2.

Examples of updated processing include sending more sophisticated recognition algorithms to video cameras or nodes that process the video information. Other examples are that certain ones of the nodes in FIG. 1 can be IP address reading sensors that are brought to bear on tracking of the non-credentialed individual or generally tracking of credentialed individuals.

Thus, the servers of FIG. 1 or other systems can generate updates to functions (not shown) that are performed at the lower tiers, these nodes can receive 46 these new or updated functions and apply 48 the changed function to processing of FIG. 2. As previously tracked individuals the depart, card readers can determine/sense credentials and the process can determine if they were validly credentialed and if so, terminate tracking on those departed individuals. On the other hand as new tracked individuals join, card readers can determine/sense credentials and the process can determine if they are validly credentialed and if so, terminate tracking on those new individuals. At some point the non-credentialed individual can be isolated to one or a few individuals, and his/their location(s) identified. The process produces and sends a message that notifies authorities to physically intervene with the message including available location information.

The nodes may be implemented using any appropriate type of computing device, such as a mainframe work station, a personal computer, a server, a portable computing device, or any other type of intelligent device capable of executing instructions, connecting to a network, and forwarding data packets through the network. The nodes can execute any appropriate computer programs to generate, receive, and transmit data packets for use on the network.

Figure 4:
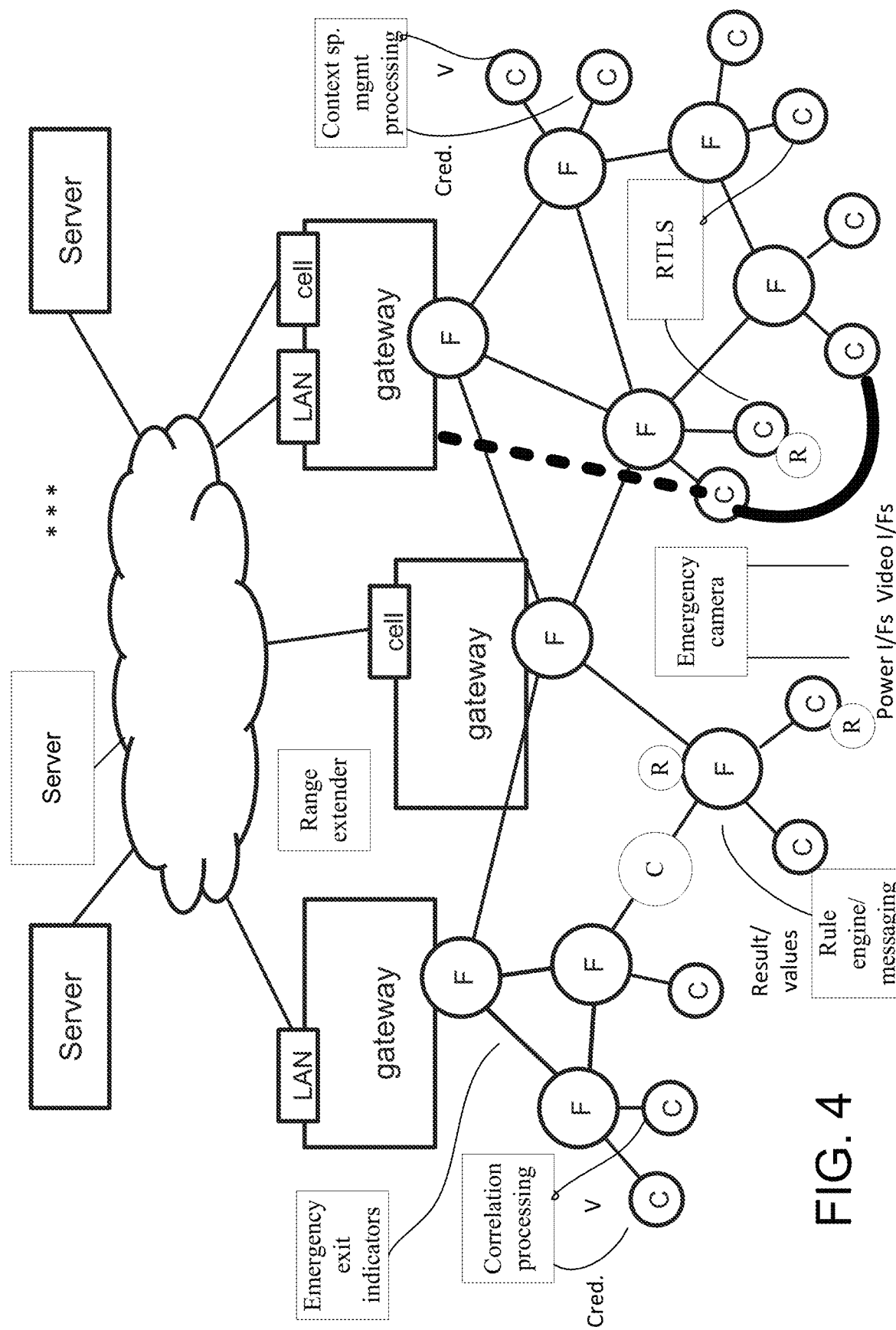
FIG. 4 is a block diagram of components of an example networked security system.

FIG. 4 shows an example of a security system having features of the WSN described with respect to FIGS. 1 to 3 and having the various functionalities described herein. As shown in FIG. 4, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. An intrusion system comprising:
one or more computing devices, the one or more computing devices comprising one or more processor devices and one or more memory devices in communication with the one or more processor devices, wherein the one or more processor devices are configured to:
receive from reader devices, sensory inputs associated with credentials or badges, wherein the reader devices are associated with one or more first areas of a monitored premises;
receive video data from camera devices, wherein the video data comprises a video feed of the one or more first areas and one or more second areas of the monitored premises;
correlate the sensory inputs of the reader devices with the video data of the camera devices;
determine from the sensory inputs, a number of the credentials or the badges within the one or more first areas of the monitored premises;
determine from the video data, a number of individuals within the one or more first areas of the monitored premises;
track a group of individuals based on the video data in response to a determination that the group of individuals have moved from the one or more first areas to the one or more second areas and in response to a determination that the number of the credentials or the badges does not match the number of the individuals;
determine that a first individual of the group of individuals is an authorized individual by determining, based on the video data and first sensory inputs of the reader devices, that the first individual has departed the monitored premises with a first authorized credential or a first authorized badge;
determine that a second individual of the group of individuals is unauthorized by determining, based on the video data and data of the reader devices, that the second individual has departed the monitored premises without an authorized credential or an authorized badge; and
determine that one or more remaining individuals of the group of individuals that are within the monitored premises are unauthorized individuals based on the first individual of the group of individuals being the authorized individual and the second individual of the group of individuals being unauthorized.

2. The system of claim 1, wherein the one or more processor devices are configured to:
apply one or more recognition algorithms to the video data to coarsely recognize features identifying the number of the individuals; and
produce an alert to send a control center to alert authorities to a particular location of a non-credentialed individual, the particular location being based on device locations of the camera devices and the reader devices.

3. The system of claim 1, wherein the one or more processor devices are configured to apply video recognition to identify the number of the individuals.

4. The system of claim 3, wherein the one or more processor devices are configured to determine a mismatch between the number of the individuals and the number of the credentials or the badges.

5. The system of claim 4, wherein the one or more processor devices are configured to:
continually track the group of individuals and movements of the group of individuals throughout the monitored premises; and
correlate the movements of the group of individuals with different readings of valid credentials or valid badges to isolate the unauthorized individuals.

6. The system of claim 1, wherein the one or more computing devices include an application layer configured to execute routines to provide node functions, the application layer operating under an operating system allowing loading and execution of individual node functions after an initial booting of the one or more computing devices without requiring a rebooting of the one or more computing devices to execute routines dynamically changed after the initial booting of the one or more computing devices.

7. The system of claim 1, wherein the system receives updated routines from server systems, the updated routines being updates for recognition algorithms.

8. The system of claim 1, wherein the system comprises a plurality of nodes, wherein at least one of the plurality of nodes is configured to:
apply video recognition to frames of captured video to recognize features that correspond to the individuals appearing in the captured video; and
determine the number of the individuals within the frames.

9. The system of claim 8, wherein the at least one of the plurality of nodes is configured to update a video recognition algorithm configured to recognize the features that correspond to the number of individuals.

10. The system of claim 1, configured to correlate paths taken by different individuals with different readings of valid credentials or valid badges from same or different sets of the reader devices and the camera devices.

11. A security system of a building, the system comprising:
a network comprising a plurality of computing device nodes, wherein each of the plurality of computing device nodes comprises one or more processor devices and one or more memory devices in communication with the one or more processor devices, the network of the plurality of computing device nodes executing an application layer to perform node functions, wherein the network of the plurality of computing device nodes is configured to:
receive from reader device nodes, sensory inputs associated with credentials or badges, wherein the reader device nodes are associated with one or more first areas of the building;
receive video data information from camera device nodes, wherein the video data comprises a video feed of the one or more first areas and one or more second areas of the building;
correlate the sensory inputs of the reader device nodes with the video data of the camera device nodes;
determine from the sensory inputs, a number of the credentials or the badges within the building;
determine from the video data, a number of individuals within the one or more first areas of the building;
track a group of individuals based on the video data in response to a determination that the group of individuals have moved from the one or more first areas to the one or more second areas and in response to a determination that the number of the credentials or the badges does not match the number of the individuals;
determine that a first individual of the group of individuals is an authorized individual by determining, based on the video data and first sensory inputs of the reader device nodes that the first individual has departed the building with a first authorized credential or a first authorized badge;
determine that a second individual of the group of individuals is unauthorized by determining, based on the video data and data of the reader device nodes, that the second individual has departed the building without an authorized credential or an authorized badge; and
determine that one or more remaining individuals of the group of individuals that are within the building are unauthorized individuals based on the first individual of the group of individuals being the authorized individual and the second individual of the group of individuals being unauthorized.

12. The system of claim 11, wherein the network of the plurality of computing device nodes is configured to dynamically change first algorithms configured to detect presence of a particular number of the individuals to second algorithms configured to apply video recognition to recognize the individuals.

13. The system of claim 11, wherein one or more computing device nodes of the plurality of computing device nodes are configured to dynamically update a video recognition algorithm to find features to a particular number of the individuals.

14. The system of claim 11, wherein the network of the plurality of computing device nodes is configured to:
dynamically change recognition algorithms; and
correlate paths taken by different individuals with different readings of valid credentials or valid badges from a same or different set of the camera device nodes and the reader device nodes.

15. The system of claim 11, wherein the network of the plurality of computing device nodes is configured to dynamically change one or more algorithms of one or more of the plurality of computing device nodes while tracking the group of individuals by the one or more of the plurality of computing device nodes by executing an operating system allowing loading and execution of individual algorithms after an initial booting stage without requiring a rebooting of the one or more of the plurality of computing device nodes to dynamically change the one or more algorithms.

16. A method of a security system of a monitored premises, the method comprising:
receiving, by one or more processing circuits, from reader devices, sensory inputs associated with credentials or badges, wherein the reader devices are associated with one or more first areas of the monitored premises;
receiving, by the one or more processing circuits, video data from camera devices, wherein the video data comprises a video feed of the one or more first areas and one or more second areas of the monitored premises;
determining, by the one or more processing circuits, from the sensory inputs, a number of the credentials or the badges within the one or more first areas of the monitored premises;
determining, by the one or more processing circuits, from the video data, a number of individuals within the one or more first areas of the monitored premises;

tracking, by the one or more processing circuits, a group of individuals based on the video data in response to a determination that the group of individuals have moved from the one or more first areas to the one or more second areas and in response to a determination that the number of the credentials or the badges does not match the number of the individuals;

determine that a first individual of the group of individuals is an authorized individual by determining, based on the video data and first sensory inputs of the reader devices, that the first individual has departed the monitored premises with a first authorized credential or a first authorized badge;

determining, by the one or more processing circuits, that a second individual of the group of individuals is unauthorized by determining, based on the video data and data of the reader devices, that the second individual has departed the monitored premises without an authorized credential or an authorized badge; and determining, by the one or more processing circuits, that one or more remaining individuals of the group of individuals that are within the monitored premises are unauthorized individuals based on the first individual of the group of individuals being the authorized individual and the second individual of the group of individuals being unauthorized.

17. The method of claim 16, comprising:

receiving, by the one or more processing circuits, updated operating routines from server systems, the updated routines updating object based image recognition algorithms executed by the one or more processing circuits.

18. The method of claim 16, comprising:

executing, by the one or more processing circuits, an application layer for one or more devices to provide node functions, with the application layer operating under an operating system allows for loading and execution of individual node functions after an initial booting of the one or more devices without requiring a rebooting of the one or more devices to execute routines dynamically changed after the initial booting of the one or more devices.

19. The method of claim 16, comprising:

applying, by the one or more processing circuits, one or more recognition algorithms to the video data to coarsely recognize features to identify the number of the individuals; and producing, by the one or more processing circuits, an alert to send a control center to alert authorities to a particular location of a non-credentialed individual, the particular location being based on device locations of the camera devices and the reader devices.

20. The method of claim 19, comprising:

continually tracking, by the one or more processing circuits, the group of individuals and movements of the group of individuals throughout the monitored premises; and correlating, by the one or more processing circuits, the movements of the group of individuals with different readings of valid credentials or valid badges to isolate the unauthorized individuals.

* * * * *